United States Patent Office 2,861,055
Patented Nov. 18, 1958

2,861,055

COPOLYESTERS OF A GLYCOL AND AN ALKYLENE DIAMINE DICARBOXYLATE CONTAINING ISOPHTHALATE MODIFIER AND THEIR PREPARATION

Jack L. R. Williams and Thomas M. Laakso, Rochester, N. Y., assignors to Eastman Kodak Company, Rochester, N. Y., a corporation of New Jersey No Drawing. Application April 26, 1955
Serial No. 504,104

14 Claims. (Cl. 260—75)

This invention relates to linear copolyesters containing internal amide linkages and to the manufacture thereof and shaped articles prepared therefrom.

The linear condensation polymers which have achieved commercial utility heretofore generally fall into two classes, viz. the polyesters and the polyamides. The polyesters are condensation products of one or more glycols with one or more dicarboxylic acids, as typified by the terephthalate polyesters. The polyamides are condensation products of dicarboxylic acids with diamines, as typified by nylon-type polymers. Both broad types of condensation polymers in highly polymeric form were shown by Carothers in U. S. 2,071,250.

Another type of condensation polymer known as polyester-amide polymers was also disclosed by Carothers, and represented an attempt to combine the advantages of the polyesters and the polyamides in a single polymer without the disadvantages inherent in both types. These polyester-amides were usually prepared by direct coreaction of glycol, dicarboxylic acid and diamine, but their properties were not sufficiently good to make these materials of any great commercial value. In the preparation of such polyester-amides, there are competing reactions of polyester formation and polyamide formation, and the heterogeneous products were difficult to obtain at the desired inherent viscosity and usually had undesirably low melting points and mechanical properties.

In the preparation of condensation polymers, it is desirable to be able to readily carry out the condensation polymerization to a fiber-forming viscosity, which usually necessitates an inherent viscosity of at least 0.4 and often of the order of 0.7–1.0 or higher in order to achieve film and fiber-forming products with the desired physical properties. When the fiber-forming stage is reached, the polymers are capable of being oriented by being stretched either longitudinally or laterally or both, and the oriented polymers possess unusual tensile strength, flexibility, and similar physical properties. The polyesters in particular have exceptionally good physical characteristics as regards melting point, strength, flexibility, wear resistance and the like. The polyesters, and particularly the terephthalate polyesters, however, achieve these properties at the sacrifice of dyeability, moisture absorption, solubility and workability. It has been recognized that the presence of amino groups or amide linkages in condensation polymers should improve dyeability, moisture absorption, etc., but heretofore the other properties such as softening temperature have been lowered so greatly in polyester-amides that the polymers of this type have not achieved widespread commercial acceptance. Furthermore, the presence of amide linkages often results in products with undesirable color.

In the application of Laakso and Williams, Serial No. 504,107, filed concurrently herewith, new and highly useful linear condensation polymers are disclosed and claimed which possess a unique combination of the properties characteristic of polyesters and polyamides without the sacrifice of other desirable properties. These new polymers are characterized by a regularly recurring structure of structural groups of the formula

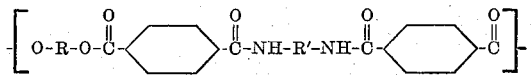

wherein R and R' are the same or different alkylene groups containing 2–10 carbon atoms, and result from the condensation polymerization of one or more alkylene glycols of 2–10 carbon atoms with one or more monomeric esters of N,N'-bis (p-carboxybenzoyl) alkylene diamines containing 2–10 carbon atoms.

These polyesters possess melting points above 200° C., are readily prepared by short period polymerization processes, and can be readily extruded into fibers or sheets (including films) which can be oriented by drawing to give high strength, wear resistant, flexible products of unusual dyeability coupled with excellent moisture absorption characteristics and unusually high heat distortion temperature. These materials thus possess excellent utility in the manufacture of fibers and sheeting, and are of particular utility for use as film base or support layers for photosensitive emulsions in photographic film. In some cases, particularly with thicker sections, these polymers show some tendency to crystallize slightly before quenching occurs. Consequently, it is desirable to improve the quenching properties of these polymers without affecting the other desirable properties to an objectionable degree.

It is accordingly an object to provide new copolyesters having improved quenchability in addition to the excellent melting point, tensile strength, flexibility, wear resistance, dyeability moisture absorption and similar properties characteristic of unmodified polyesters from glycols and esters of N,N'-bis(p-carboxybenzoyl)alklyene diamines.

It is another object of the invention to provide methods of preparing such improved copolyesters.

Another object of the invention is to provide copolyesters containing internal amide linkages but free of the disadvantages normally inherent in polyester-amides.

Another object of the invention is to provide new and improved copolyesters which are particularly useful in the manufacture of synthetic fibers and of film or sheeting, particularly for use as base or support in photographic film applications; and which have improved processing characteristics particularly as regards obviating crystallization during quenching.

Other objects will be apparent from the description and claims which follow.

These and other objects are attained by means of this invention wherein copolyesters having a unique combination of properties are prepared by coreacting bifunctional monomeric reactants which consist functionally or alkylene glycol, N,N'-bis(p-carboxybenzoyl)alkylene diamine and isophthalic acid. Despite the presence of the third component, the copolyesters of the invention possess the highly advantageous combination of properties normally posessed only by the homogeneous polyesters consisting essentially of recurring structural units of the formula

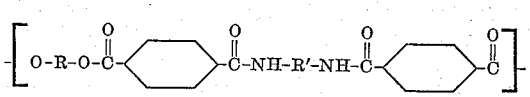

wherein R and R' are the same or different alkylene groups containing 2–10 carbon atoms; and in addition, these copolyesters exhibit improved quenchability facilitating the manufacture of extruded articles therefrom. The copolyesters embodying the invention can be readily oriented by drawing to give the excellent mechanical characteristics exhibited by oriented polyesters, In accordance with the invention, the copolyesters are prepared by concomitant condensation polymerization of three distinct classes of materials, viz. those which enter functionally into the condensation polymerization as alkylene glycols containing 2–10 carbon atoms, those which enter functionally into the condensation polymerization as N,N'-bis(p-carboxybenzoyl)alkylene diamines wherein the alkylene group contains 2–10 carbon atoms, and those which enter functionally into the condensation polymerization as isophthalic acid. Thus, the glycols form the dihydroxylic component and the acids form the dicarboxylic component. These bifunctional reactants can be used in the form of the free glycols and acids, or in the form of esters of one or more of such reactants or in the form of ester-forming derivatives such as halides or the like. Since the terminal groups are split out in the initial condensation stage of the condensation polymerization, their nature does not affect the nature of the copolyester, and the unesterified reactants, esterified reactants and the like are functionally equivalent as concerns the process and product. Generally, the glycols are used in free form and the acidic components in esterified form for facilitating the course of the reaction, although it will be understood that the glycols can be esterified or one or more of the acids can be in free form as desired.

In accordance with the invention, one of the reactants employed is a monomeric dicarboxylic compound of the formula

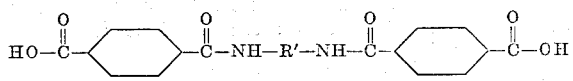

wherein R' is an alkylene group, preferably a polymethylene group, containing 2–10 carbon atoms, and such dicarboxylic compound is preferably employed as a phenyl or alkyl diester and desirably as a lower alkyl diester wherein the alkyl group contains 1–6 carbon atoms for ease of removal of the alcohol liberated in the initial ester-interchange stage of the reaction. In order to achieve the improved results characteristic of the invention, this dicarboxylic compound is employed as a preformed monomer since there are therefore no competing polyester and polyamide reactions during the polymerization. By use of this preformed monomeric material containing stable internal amide linkages which are unaffected by the polymerization conditions, the products obtained differ greatly from the mixed polyester-amides of random structure obtained by coreacting a glycol, terephthalic acid and a diamine.

The polymers embodying this invention are readily made in viscosities sufficient for formation of fibers having the improved properties characteristic of oriented polymers, and they can readily be made at viscosities of 0.7–1.2 and preferably above about 0.8 with no difficulty. The melting points of the polymers embodying the invention are unexpectedly high, usually being in excess of 200° C. at viscosities of 0.8 or higher even when relatively high concentrations of isophthalic acid component are employed as modifier, melting points of 230–270° C. commonly being obtained. This melting point range compares favorably with that of unmodified polyesters, such as terephthalate polyesters, and is in marked contrast to the melting points of 80–150° C. which are common with previously known polyester-amides prepared by conventional methods. The polymers of the invention also possess great strength, flexibility and wear resistance comparable to the best unmodified polyesters, and in addition possess excellent quenchability together with recurrent amide linkages effective to improve such properties as dyeability, processability and moisture absorption without objectionable color formation.

The esters of N,N'-bis(p-carboxybenzoyl)alkylene diamines employed in practicing the invention can be prepared in any manner which will give the material in monomeric form. Although the phenyl or any of the alkyl diesters can be used, the diisobutyl esters are preferred because of their unique solubility characteristics which facilitate preparation of the monomer. The preferred method for making the monomeric esters of N,N'-bis(p-carboxybenzoyl)alkylene diamines, and particularly the N,N'-bis(p-carbalkoxybenzoyl)polymethylene diamines containing 2–10 methylene groups in the polymethylene unit which are preferably employed, involves reacting one molar proportion of an alkylene diamine, preferably a polymethylene diamine, with two molar proportions of a p-carbalkoxybenzoyl chloride under controlled conditions whereupon the desired monomer is obtained in nearly quantitative yield. The diamine employed can be any of the alkylene diamines containing 2–10 carbon atoms; and, if desired, monomeric mixtures can be prepared by employing two or more diamines which is sometimes desirable when a polymer having particular properties is desired. Of the diamines, either straight or branched chain alkylene diamines can be used, with the polymethylene diamines typified by ethylene diamine, tetramethylene diamine, trimethylene diamine, pentamethylene diamine, hexamethylene diamine, heptamethylene diamine, octamethylene diamine, nonamethylene diamine and decamethylene diamine being preferred.

As indicated hereinabove, the nature of the ester groups on the monomer do not affect the course of the condensation process and the diamine or diamines can be reacted with p-carbophenoxy benzoyl chloride, p-carbomethoxy benzoyl chloride, p-carboethoxy benzoyl chloride, p-carbopropoxy benzoyl chloride, p-carboisopropoxy benzoyl chloride or similar p-carbalkoxybenzoyl chlorides as desired to form the dicarboxylic monomer. The dicarboxylic monomers and their preparation is disclosed and claimed in the copending application of Williams and Laakso, Serial No. 504,105, filed concurrently herewith. The preparation of typical dicarboxylate monomers used in practicing the invention is illustrated in the following examples, although it will be understood that other monomers as defined herein can be used in practicing the invention regardless of the method of preparation of such dicarboxylate monomers.

EXAMPLE 1

Under essentially dry conditions, 20 parts by weight (0.3 molar equivalent) of ethylene diamine was dissolved in 250 parts by volume of dry pyridine and the solution chilled to 0° C. With efficient stirring, 127.5 parts by weight (0.6 molar equivalent) of p-carbethoxybenzoyl chloride was added slowly to the solution at a rate whereby the temperature was maintained between 0° and 10° C. Stirring was continued for 15 minutes, and the reaction mixture was then poured into ice water. The light cream colored solid which precipitated was filtered by suction. By recrystallization from ethyl alcohol, pure white N,N'-bis(p-carbethoxybenzoyl)ethylene diamine melting at 245.5°–246° C. was obtained in a yield of 90% of theoretical.

Analysis.—Calculated for $C_{22}H_{24}O_6N_2$: C, 64.2; H, 5.8; N, 6.8. Found: C, 64.5; H, 6.1; N, 7.3.

EXAMPLE 2

Under essentially dry conditions, 34.8 parts by weight (0.3 molar equivalents) of hexamethylene diamine was dissolved in 500 parts by volume of dry pyridine and chilled to 0° C. With efficient stirring, 127.5 parts by weight (0.6 molar equivalents) of p-carbethoxybenzoyl chloride was added slowly to the solution while maintaining the solution temperature at 0° to 10° C. Stirring was continued for 15 minutes whereupon the reaction mixture was poured into ice water. The light cream colored solid which precipitated was filtered by suction and recrystallized from ethyl alcohol to give pure white N,N'- bis(p-carbethoxybenzoyl)hexamethylene diamine melting at 207°–208° C., in a yield of 88.8% of theoretical.

*Analysis.*—Calculated for $C_{26}H_{32}O_6N_2$: C, 66.7; H, 6.8; N, 5.9. Found: C, 67.0; H, 7.1; N, 5.9.

EXAMPLE 3

A solution of 80 g. (2 moles) of sodium hydroxide in 300 ml. of water was added, with stirring, to a solution of 161 g. (1 mole) of tetramethylene diamine hydrochloride in 500 ml. of water. To the resulting solution, 1 liter of benzene was added, followed by 198.5 g. (1 mole) of p-carbomethoxybenzoyl chloride which was added all at once with efficient stirring. After 5 minutes, 150 ml. (1 mole) of sodium hydroxide solution was added rapidly. Thereafter at 15 minute intervals, p-carbomethoxybenzoyl chloride and sodium hydroxide solution were added successively until an additional 200 g. of the acid chloride and an additional 150 ml. of caustic solution had been added. When addition was completed, the reaction mixture was stirred for one hour and then poured into cold water to precipitate the product. The white product was filtered, washed with water, dried, recrystallized from dimethyl formamide, washed with alcohol and dried to give white crystalline N,N'-bis(p-carbomethoxybenzoyl)tetramethylene diamine melting at 255–256° C. in a yield of 75.7% of theoretical.

*Analysis.*—Calculated for $C_{22}H_{26}O_6N_2$: C, 64.3; H, 5.8; N, 6.8. Found: C, 64.1; H, 6.1; N, 7.2.

EXAMPLE 4

Under essentially anhydrous conditions, 198.5 g. (1 mole) of p-carbomethoxybenzoyl chloride was added dropwise to a well-stirred solution of 58 g. (0.5 mole) of hexamethylene diamine in 1000 ml. of dry pyridine. The temperature of the reaction mixture was maintained below 50° C. during the addition. The reaction mixture was stirred for one hour, poured into ice water, and the cream colored precipitate was filtered out and recrystallized from alcohol. The yield of pure white N,N'-bis(p-carbomethoxybenzoyl)hexamethylene diamine was 63% of theoretical.

*Analysis.*—Calculated for $C_{24}H_{28}O_6N_2$: C, 65.4; H, 6.4; N, 6.4. Found: C, 65.8; H, 6.4; N, 6.2.

The dicarboxylic monomers useful in practicing the invention can thus be methyl, ethyl, propyl, isopropyl, butyl, isobutyl or other diesters of such dicarboxylic acids as N,N'-bis(p-carboxybenzoyl)ethylene diamine, N,N'-bis(p-carboxybenzoyl)trimethylene diamine, N,N'-bis(p-carboxybenzoyl)tetramethylene diamine, N,N'-bis(p-carboxybenzoyl)pentamethylene diamine, N,N'-bis(p-carboxybenzoyl)hexamethylene diamine, N,N'-bis(p-carboxybenzoyl)heptamethylene diamine, N,N'-bis(p-carboxybenzoyl)octamethylene diamine, N,N'-bis(p-carboxybenzoyl)nonamethylene diamine, and N,N'-bis(p-carboxybenzoyl)decamethylene diamine; and such monomers can be employed singly or in combinations of two or more of these or similar dicarboxylate monomers as defined herein for condensation with the glycol and the isophthalic acid or ester.

In practicing the invention, one or more of the amide-containing dicarboxylate monomers together with isophthalic acid, preferably in ester form, are condensed with one or more alkylene glycols containing 2–10 carbon atoms by heating the reaction mixture in the presence of an ester-interchange catalyst whereby glycol diesters of the acidic components are formed in an initial stage, and these glycol diesters undergo condensation polymerization by continued heating under reduced pressure, with evolution of glycol, until the polymer reached a fiber-forming state. The glycol can be a straight or a branched chain glycol or mixtures of glycols, the polymethylene glycols preferably being employed predominantly. In the practice of the invention, the amide-containing dicarboxylic monomer constitutes 10–95 mole percent and the isophthalate constitues 90–5 mole percent of the total weight of acidic components employed. Since the isophthalate component tends to lower the melting point with increasing concentration, it desirably is employed in an amount such that the melting point of the copolyester is above 200° C. for use in the fiber and film fields, amounts of 5–50 mole percent of the isophthalate component and 95–50 mole percent of the amide-containing dicarboxylate component based on the total weight of acidic components being desirably employed. Since the use of short chain glycols or amide-containing monomers containing short chains between the amide groups tends to raise the melting point of the polymers, the amount of isophthalate component employed is desirably larger so as to bring the melting point of the copolyester within the preferred range of 200–270° C.

The glycols which are desirably employed for reaction with the acidic components are the polymethylene glycols such as ethylene glycol, trimethylene glycol, tetramethylene glycol, pentamethylene glycol, hexamethylene glycol, heptamethylene glycol, octamethylene glycol, nonamethylene glycol, and decamethylene glycol which can be employed singly or in mixtures of two or more, although other alkylene glycols such as 2,2-dimethyl-1,3-propanediol and the like can be used alone or preferably together with a predominant amount of polymethylene glycol.

In the initial stages of the process embodying the invention, the glycol of the formula

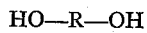

HO—R—OH wherein R is an alkylene group of 2–10 carbon atoms, undergoes ester-interchange with the acidic components to give a mixture of glycol esters of the formulas

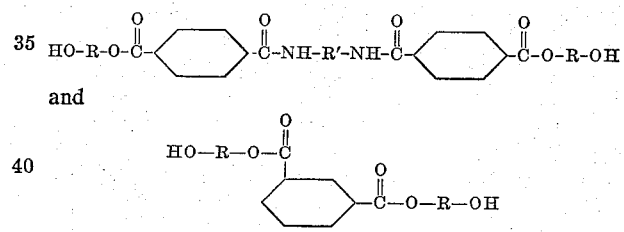

and

These glycol esters then undergo condensation polymerization with liberation of glycol to form a highly polymeric copolyester. Despite the use of the isophthalate, the resulting polymers crystallize and undergo orientation on stretching to give oriented polymers having excellent physical and mechanical properties quite unlike the usual non-linear polymers such as polymethylene isophthalate condensation polymers.

Under ordinary reaction conditions, there is very little degradation of the amide-containing dicarboxylate monomer and consequently the polymerization process is substantially completely a polyester reaction with little or no polyamide formation. In carrying out the process embodying the invention, one molar proportion of the mixture of dicarboxylate monomers is reacted with at least two molar proportions of the glycol. The isophthalate portion of the dicarboxylate monomers can be isophthalic acid or a phenyl or higher alkyl diester of isophthalic acid or an ester-forming derivative thereof, but best results are obtained employing a lower alkyl diester of isophthalic acid wherein each alkyl group contains 1–6 carbon atoms. Thus the preferred isophthalates are typified by but not limited to dimethyl isophthalate, diethyl isophthalate, diisopropyl isophthalate, dibutyl isophthalate, diisobutyl isophthalate, dihexyl isophthalate and the like.

In carrying out the process, an excess of glycol is preferably employed. The initial ester-interchange is readily effected by heating the mixture of glycol component and dicarboxylate components in the presence of an ester-interchange catalyst and at a temperature above the melting point of the components. The initial stage of the reaction is usually carried out at atmospheric pressure and a temperature of 100–300° C. and preferably 200–300° C. for best results, although lower or higher temperatures can be employed in some cases. During the course of the ester-interchange in the initial stage of the process, monohydric alcohol is liberated corresponding to the nature of the ester groups on the dicarboxylate monomers (or water when the free dicarboxylic acids are used). For best results, the water or alcohol is removed from the reaction zone as it is liberated in order to shift the reaction equilibrium to optimum formation of the glycol esters of the dicarboxylate monomers. As has been indicated, the dicarboxylate monomers are desirably employed in the form of lower alkyl diesters for ease of removal of the liberated alcohol. If desired, however, higher alkyl or phenyl esters can be used, as well as free dicarboxylic acids or ester-forming derivatives thereof such as salts, halides or amines.

The process is facilitated by use of an ester-interchange catalyst, a large number of such catalysts being known to the art. Typical ester-interchange catalysts which can be employed include the metal hydrides such as calcium hydride, lithium hydride, sodium hydride, or the like; metal oxides such as antimony trioxide, litharge, cerium oxide, germanium oxide and the like; double metal catalysts such as lithium aluminum stearate, calcium aluminum acetate and similar catalysts containing an alkali or alkaline earth metal and an amphoteric metal, alcoholates of one or more of such metals as sodium, potassium, lithium, calcium, titanium, tin, magnesium, aluminum, zinc, and the like, alkaline reacting salts such as borates and carbonates of the alkali metals, free metals such as sodium, potassium, lithium, calcium, cobalt, tin, germanium, cerium, magnesium, tin, lead, antimony and the like as well as salts of these and similar metals and other well known ester-interchange catalysts such as zirconium compounds and the like. Particularly good results are obtained with the titanium compounds such as titanium butoxide, sodium hydrogen titanium ethoxide butoxide and the like, preferably together with water as a co-catalyst for low color formation. The catalyst or catalyst mixture is preferably employed in a concentration of at least 0.001% by weight based on the weight of reactants with amounts of 0.001% to 0.05% by weight being preferred. Larger amounts of catalyst can also be used although such larger amounts usually are not necessary for optimum results.

The initial stage of the reaction is usually complete in 5–30 minutes; and, if desired, the temperature can be raised or the pressure reduced at the end of the first stage to effect completion of the removal of the alcohol liberated during the initial stage. Polymerization of the glycol ester of the dicarboxylic compound is then effected to the desired degree by continuing the heating under reduced pressure at least until the polymer reaches the fiber-forming stage. The polymerization can be effected by first obtaining a low viscosity polymer in powder form, and then continuing the polymer build-up in powder form under vacuum, or by continuing the heating after the initial stage under reduced pressure whereby the polymer remains molten until the desired molecular weight and inherent viscosity is achieved.

The polymers embodying the invention are polymerized until a fiber-forming stage is achieved, i. e. until a rod dipped into the melt will pull a filament when drawn from the melt. Usually for optimum results, the polymerization is carried out until an inherent viscosity of at least 0.8 is attained with viscosities of 0.8–1.1 being preferred, although lower or higher viscosities may be desired in certain cases. The polymers of the invention usually have melting points above 200° C. The preferred polymer compositions are those having melting points in the range of about 240°–280° C., since the polymers melting above about 280° C. are difficult to extrude and process in commercial practice.

As has been indicated, any one or more of the alkylene glycols containing 2–10 carbon atoms can be condensed with the isophthalate component and one or more of the amide-containing dicarboxylic monomers. The resulting copolyesters can be used alone or in blends of two or more of such polymers, or blends of such polymers with other polymeric materials such as polyesters, polyamides, copolyesters, polyester-amides and the like. The polymers of the invention can be quenched following polymerization by cooling to a temperature below the minimum crystallization temperature; and, even in thick sections have greatly improved resistance to crystallization during quenching. This improved quenchability facilitates the processing of the polymers and particularly the manufacture of shaped articles such as fibers, films and the like by melt extrusion. The polymers are quenched to a temperature below 100° C. and usually below 80° C.; although, unexpectedly, the polymers will undergo orientation above the minimum crystallization temperature. The polymerization proceeds rapidly and ordinarily the fiber-forming stage is reached within 10–30 minutes, although the time necessary for polymerization will vary depending upon the temperature employed, the kind and amount of catalyst, the pressure and similar variable factors. The polymerization is facilitated by removal from the reaction zone of the glycol liberated during the polymerization.

The polymers thereby obtained can be extruded from the melt to form filaments or sheets as desired. The resulting shaped articles are then oriented by being stretched either laterally or longitudinally or both whereby a marked increase in physical properties is obtained. The degree of stretching will vary somewhat depending upon the polymer composition and the properties desired, but sheets, films, fibers, etc. are usually stretched 200–600% of their original extruded dimension for best results. The shaped articles are usually cold-drawn, i. e. drawn at a temperature between the second order transition temperature and the minimum crystallization temperature of the polymer; although, unlike the usual polyesters, the polymers embodying the invention can be oriented by drawing at temperatures of as much as 50° above the minimum crystallization temperature in some cases.

The fibers, films, sheets, etc. which have been drawn are characterized by exceptional physical and mechanical properties, including strength, flexibility, wear resistance and the like, comparable to terephthalate polymers. In addition, the polymers of the invention have unusually high heat distortion temperatures which are often as much as 40° C. above the ordinary heat distortion temperature of terephthalate polyesters which have been oriented but not relaxed. The polymers of the invention thus possess the excellent melting point and physical characteristics of the best polyesters known heretofore but combine this with unusually high heat distortion temperatures, excellent dye affinity, and moisture adsorption higher than that of conventional polyesters. The high heat distortion characteristics are attained by heating the oriented polymer above its minimum crystallization temperature, as for example at 170° C., to cause crystallization but without the necessity of shrinking the stretched polymer as is usually the case.

In fiber applications, filaments having strength of as high as 6–8 grams per denier can be readily obtained, combined with good dyeability and moisture absorption which usually are sacrificed in conventional polyesters. The polymers also possess excellent utility in photographic applications as for example for use as film base for carrying photosensitive silver halide emulsions in black-and-white or color film. The unusually high heat distortion temperature also makes these polymers unique for applications where dimensional stability against thermal distortion is a serious problem.

Any of the copolyesters of bifunctional reactants consisting functionally of alkylene glycol containing 2–10 carbon atoms and dicarboxylate monomers consisting functionally of 10–95 mole percent of N,N'-bis(p-carboxybenzoyl)polymethylene diamine and 90–5 mole percent of isophthalic acid, are within the scope of the invention. For manufacture of films and fibers, it is usually desirable that the total number of carbon atoms in the glycol and in the polymethylene unit between the amide groups in the amide-containing dicarboxylate monomer be at least 8 in at least half of the reactants employed, and the polymers showing optimum properties have the total number of carbon atoms referred to equal to at least 10 in at least one quarter of the reactants. The polymers which have shown particular utility are those wherein the glycol is butane-1,4-diol, pentane-1,5-diol or hexane-1,6-diol, the amide-containing monomer is an ester of N,N'-bis(p-carboxybenzoyl)ethylene diamine, N,N'-bis(p-carboxybenzoyl)tetramethylene diamine or N,N'-bis(p-carboxybenzoyl)hexamethylene diamine, and the isophthalate component amounts to 5–60 mole percent of the total weight of dicarboxylate components. These copolyesters have melting points above 200° C. and usualy in the range of 210–270° C., and can readily be extruded from the melt into films, sheets, fibers or similar shaped articles which, after drawing, possess excellent mechanical and physical properties combined with good dye affinity and moisture absorption characteristics.

The presence of the isophthalate component markedly lowers the melting point of the polymers as well as greatly improving the quenchability without, at the same time, lessening the other desirable properties. The use of the isophthalate component also makes the use of shorter chain glycols or amide-containing monomers more practical because of its effect on the melting point, which can be of considerable economic advantage. Furthermore, the more readily available isophthalate can replace substantial amounts of the more expensive amide-containing monomer and also makes possible the adjustment of melting point to any desired value within the copolyester range. Since isophthalate polyesters are ordinarily of very limited utility, the excellent properties obtained with copolyesters containing very substantial amounts of isophthalate component in accordance with the invention was wholly unexpected.

In the manufacture of film or sheeting, the polymer is desirably extruded from the melt either onto a casting roll or between paired rolls and then drawn both longitudinally and laterally, either concomitantly or successively, to from 200–600% of its original dimensions in order to orient the molecules. Thereafter, the oriented film or sheet is desirably heated at a temperature above the minimum crystallization temperature until the desired degree of crystallization results. In the case of film to be used for photographic applications where it is desirable to coat the film with photosensitive silver halide emulsions or other coating layers, the film can be coated with a subbing material, such as a resin or copolymer sub before the orientation or between the drafting steps or before the heat treatment following orientation. In some cases, particularly with modified polyester subs of good solubility, it is more convenient to sub the oriented and crystallized film after the film processing has been completed. The subbed film can then be supplied with the usual photosensitive emulsion layers, anti-halation backing, etc. in accordance with well known photographic practice.

The copolyesters containing relatively large amounts of isophthalate component, because of their increased solubility, while less desirable for film and fiber manufacture, offer excellent properties for use in subbing polyester films. Furthermore, the increased solubility due to the isophthalate component is an advantage of all of the compositions embodying the invention since a primary disadvantage of most high strength polyesters is their extreme insolubility in most common solvents.

In the manufacture of fibers, the molten polymer is extruded through a spinneret and quenched. The resulting fiber is then drafted 50–600% and heat treated for crystallization. The resulting fibers have hot bar sticking temperatures above 200° C. in most cases, combined with strength of the order of 6–8 grams per denier, excellent dye affinity for most textile dyes and moisture absorption characteristics which make the fibers resemble natural fibers more than is generally the case with synthetic polyester fibers. In contrast to the usual polyesters containing amino groups, very little color formation is observed and textiles prepared from fibers embodying the invention can be dyed to deep shades or with pastel dyes or fleeting tints as desired. Consequently, the polymers of the invention show unique versatility among the synthetic condensation polymers since they combine the desirable characteristics of both the polyesters and the polyamides without the disadvantages of either type.

The improved results obtained in accordance with the invention appear to result from the absence of competing reactions of different rates during polymerization, and particularly to the absence of competing polyester and polyamide reactions. The results are in sharp contrast to those obtained by more direct methods using a glycol, a free diamine and an isophthalate which might be expected to give similar results since all of the units of the polymer are present in monomeric form. Such other methods which do not employ the monomeric N,N'-bis(p-carboxybenzoyl)alkylene diamine (or ester thereof), however, do not give products comparable to those of the present invention, even though the products of the present invention resemble polyester-amides in overall composition. Thus, for example, among the conventional polyester-amide processes which do not give the greatly improved results obtained in accordance with the invention are such methods as reacting an alkyl terephthalate and an alkyl isophthalate with a polymethylene diamine followed by reaction of the product with a polymethylene glycol, reacting an alkyl terephthalate and an alkyl isophthalate with a polymethylene glycol followed by reaction of the product with an alkylene diamine, and coreacting a glycol, diamine and terephthalate and isophthalate concomitantly. In such cases, the difference in rate constants between such reactions as ester-ester interchange, ester-amine interchange, and glycol-amide interchange appear to be the governing factor hampering the formation of polymers comparable to those of the present invention. The amine-ester interchange usually proceeds the most rapidly; and, in practice, the polyamide usually is produced in preference to all other species except when the ratio of components in order of addition is such that the possibility of polyester-amides of regular structure is precluded. It is usually difficult if not impossible to stop the direct reactions at the N,N'-bis(p-carbalkoxybenzoyl)polymethylene diamine monomer which appears necessary to achieve the advantageous properties of the polymers of this invention.

Furthermore, not only is the product a mixture or copolymer of polyester and polyamide in methods which do not employ the preformed amide-containing monomer but the polyester portion is polymethylene isophthalate which has very poor properties. Consequently, the mixed polyester - amides prepared by conventional methods from a glycol, a diamine, a terephthalate and an isophthalate are of little if any utility for use in fiber or film manufacture. They are of even less utility than the polyester - amides prepared by direct coreaction methods using a glycol, diamine and terephthalate without an isophthalate as shown in Examples 5–9 of the copending application of Laakso and Williams referred to hereinabove.

The following examples illustrate the preparation of preferred copolyesters embodying the invention, it being understood that any of the other copolyesters as defined herein can also be prepared in similar fashion.

EXAMPLE 5

Among the most valuable copolyesters embodying the invention are those prepared by coreacting hexane-1,6-diol with an isophthalate and an ester of N,N'-bis(p-carboxybenzoyl)hexamethylene diamine. Of these materials, those containing 10–40 mole percent and preferably 20–30 mole percent of isophthalate based on the total amount of dicarboxylate monomers are of especial utility in the manufacture of film support for use in photographic film manufacture. Thus a mixture of 0.7 mole of N,N'-bis(p-carbethoxybenzoyl)hexamethylene diamine, 0.3 mole of dimethyl isophthalate and 2.5 moles of hexane-1,6-diol was melted at 250° C. under a dry nitrogen stream. After the addition of 2.5 ml. of catalyst (prepared by adding 1.5 ml. of titanium butoxide to a solution of 0.1 g. of sodium dissolved in 50 ml. of absolute ethanol under nitrogen), the temperature was gradually raised from 240° C. to 275° C. over a period of 25 minutes. The system was then evacuated with a water aspirator to remove the residual alcohol liberated during the ester-interchange. The melt was then polymerized by heating for 20 minutes at 275° C. and 0.3 mm. pressure to give a copolyester having an inherent viscosity of 1.18 and a melting point of 245° C. This copolyester, wherein the isophthalate formed 30 mole percent of the dicarboxylate components, was readily melt extruded into fibers and films without necessitating unduly high melt temperatures. The extruded articles readily quenched without crystallization; and, after being drawn more than 200% at a temperature of about 60–70° C. and crystallized by heating at 170° C., the articles showed stability against heat distortion and excellent strength, flexibility and wear resistance. Fibers formed from the polymer had strength of the order of 6–8 g. per denier, and showed much better dye affinity and moisture absorption than unmodified terephthalate polyesters. Films of the copolyester also showed excellent modulus and, when subbed with resin subs such as copolymer subs, formed excellent film base for supporting photosensitive silver halide emulsions in both black-and-white and color photographic films.

EXAMPLE 6

Decreasing the amount of isophthalate component to 20 mole percent increases the melting point of the copolyester somewhat. Thus, a mixture of 0.8 mole of N,N'-bis(p-carbethoxybenzoyl) hexamethylene diamine. 0.2 mole of dimethyl isophthalate, and 2.5 moles of hexane-1,6-diol was coreacted as described in the preceding example. The resulting copolyester had an inherent viscosity of 1.22 and a melting point of 248° C. As with the copolyester of the preceding example, this polymer readily extruded into fibers and films, and showed improved quenchability over the corresponding polymer prepared by condensing hexane-1,6-diol with N,N'-bis(p-carbethoxybenzoyl)hexamethylene diamine without the use of isophthalate modifier. This is particularly of importance in the manufacture of films and fibers of relatively large cross-section wherein the unmodified polymer shows a slight tendency to crystallize during quenching unless carefully controlled conditions are employed. After orientation, fibers and films made from the copolyester described in this and the preceding example show the excellent combination of mechanical and physical properties together with excellent dye affinity and moisture absorption characteristic of the polymers of glycols and N,N'-bis(p-carbalkoxybenzoyl)polymethylene diamines.

EXAMPLE 7

Lower melting polymers of excellent properties, particularly for fiber formation are prepared using greater amounts of isophthalate component. Thus in Table 1 are shown three typical copolyesters of hexane-1,6-diol, N,N'-bis(p-carbethoxybenzoyl)hexamethylene diamine and dimethyl isophthalate, the mole percent of isophthalate based on the total amount of isophthalate and amide-containing monomer being shown in the first column.

Table 1

| Mole percent isophthalate | Inherent viscosity | Melting point, ° C. |
|---|---|---|
| 40 | 1.14 | 228 |
| 50 | 1.20 | 219 |
| 60 | 1.09 | 211 |

EXAMPLE 8

A mixture of 32.6 g. (0.07 mole) of N,N'-bis(p-carbethoxybenzoyl)hexamethylene diamine, 6.0 g. (0.03 mole) of dimethyl isophthalate, 30 g. (0.3 mole) of butane-1,4-diol and 0.5 ml. of the catalyst solution prepared as in Example 5 was heated for 15 minutes at 240–275° C. to effect ester-interchange, and for 25 minutes at 275° C. and 0.3 mm. pressure to effect polymerization. The resulting fiber and film-forming copolyester had an inherent viscosity of 0.86 and a melting point of 271° C.

EXAMPLE 9

A mixture of 60.9 g. (0.13 mole) of N,N'-bis(p-carbethoxybenzoyl)hexamethylene diamine, 13.9 g. (0.007 mole) of dimethyl isophthalate, 54 g. (0.06 mole) of butane-1,4-diol and 1.0 ml. of the catalyst solution was heated at 240–275° C. for 25 minutes, followed by 20 minutes at 275° C. and 0.3 mm. pressure. The resulting copolyester in which 35 mole percent of the acidic components consisted of isophthalate, had an inherent viscosity of 1.04 and a melting point of 272° C. These and the other copolyesters of the invention are characterized by being formed in relatively short reaction times whereby the fiber-forming stage is readily attained.

EXAMPLE 10

As has been detailed hereinabove, the alkylene glycol can be varied within the limits of 2–10 carbon atoms, or mixtures can be used, and the N,N'-bis(p-carboxybenzoyl) alkylene diamine can also be varied or used in mixtures thereof. By a suitable choice of these reactants as well as the relative proportions of the reactants, the properties of the copolyesters can be varied markedly. For example, by use of glycol and amide-containing monomer wherein the total number of carbon atoms in the glycol and the polymethylene group between the amide nitrogens is less than 8, extremely high melting copolyesters are obtained as illustrated herein. A mixture of 20.6 g. (0.05 mole) of N,N'-bis(p-carbethoxybenzoyl) ethylene diamine, 9.7 g. (0.05 mole) of dimethyl isophthalate and 30 g. (0.3 mole) of butane-1,4-diol was reacted in accordance with the procedure described by heating at 260–280° C. for 15 minutes followed by heating at 280° C. and 0.3 mm. pressure. After 5 minutes of the second stage, a copolyester crystallized and showed a melting point of 335° C. with an inherent viscosity of but 0.20. The viscosity can be increased by further heating at 335° C. or by a powder buildup method of heating under vacuum at a temperature within about 20° C. below the melting point of the polymer.

EXAMPLE 11

A mixture of 20.6 g. (0.05 mole) of N,N'-bis(p-carbethoxybenzoyl)ethylene diamine, 9.7 g. (0.05 mole) of dimethyl isophthalate and 40 g. (0.3 mole) of hexane-1,6-diol was coreacted as described for 15 minutes at 260–275° C. and for 20 minutes at 275° C. and 0.3 mm. pressure. The resulting fiber and film-forming copolyester had an inherent viscosity of 0.65 and a melting point of 270° C. It should be noted that the inherent viscosity required for optimum fiber-formation will vary with the relative concentration of isophthalate component; since, as a general rule, the viscosity necessary for fiber formation will decrease with increasing concentration of modifier.

EXAMPLE 12

A mixture of 25.1 g. (0.06 mole) of N,N'-bis(p-carbethoxybenzoyl)ethylene diamine, 7.9 g. (0.04 mole) of dimethyl isophthalate and 40 g. (0.3 mole) of hexane-1,6-diol was reacted in accordance with the usual procedure by heating for 20 minutes at 240–275° C. and 15 minutes at 280° C. and 0.3 mm. pressure. The resulting copolyester containing 40 mole percent isophthalate had an inherent viscosity of 0.64 and a melting point of 290° C. Because of its high melting point, it tended to crystallize at the temperature employed and higher temperatures are necessary to increase the polymer buildup. By comparison with the copolyester of the preceding example, it can be seen that changing the mole concentration of isophthalate by 10 mole percent changed the melting point by 20° C.

EXAMPLE 13

A mixture of 25.1 g. (0.06 mole) of N,N'-bis(p-carbethoxybenzoyl)ethylene diamine, 7.9 g. (0.04 mole) of dimethyl isophthalate, and 40 g. (0.4 mole) of pentane-1,5-diol was reacted according to the usual procedure by heating for 15 minutes over the range of 250–275° C. followed by heating for 15 minutes at 275° C. and 0.3 mm. pressure. The resulting copolyester had an inherent viscosity of 0.69 and a melting point of 278° C. In the various copolyesters embodying the invention, the inherent viscosity can be increased by continuing the polymerization beyond that illustrated, if higher viscosity polymers are desired. The various copolyesters also are characterized generally by being readily quenchable and extrudable to form fibers and films which, after orientation, have excellent tensile strength, wear resistance, flexibility, moisture absorption and dye affinity.

The polymers herein described can also be prepared by any of the well known polymerization processes or under varying conditions known to the art. For example, a prepolymer can be prepared by coreacting the three reactants as usual at 240–275° C. for the ester-interchange stage followed by a short time, e. g. 5 minutes, under vacuum at a temperature above the melting point. The resulting low molecular weight polymer can then be pulverized and stored until needed. The powder can then be heated to a temperature of 5–25° C. below its melting point under vacuum until the polymerization is completed to the desired fiber-forming stage. Likewise, any of the esters of the dicarboxylate monomers as described can be used without affecting the nature of the copolyesters. Although the titanium catalysts are preferred, any of the other well known ester-interchange catalysts can be used. Particularly good results from the color standpoint are achieved when water is employed as a co-catalyst with the ester-interchange catalyst. The amount of catalyst can be varied without significantly affecting the course of the reaction.

Thus, by means of this invention, a new class of highly useful polymers are provided which are of particular utility in the manufacture of fibers, films and sheeting. The examples illustrate the unique combination of properties possessed by the polymers of the invention, and similar results are obtained with the other polymers within the scope of the invention as described herein. By means of this invention, it is possible to obtain in a single polymer the advantageous characteristics of both the polyesters and the polyamides.

In effecting the condensation reaction, the ester-interchange stage of the process is usually carried out at a temperature above 200° C. or above the melting point of the reactants. The second or polymerization stage is also usually carried out above 200° C. and can be effected above the melting point of the glycol ester (and the polymer being formed) in the melt process or at a temperature not more than 20° C. below the melting point of the glycol ester in the powder polymerization process. In the case of the polymers prepared from such glycols as tetramethylene, pentamethylene or hexamethylene glycol, the temperature in the polymerization stage is preferably at least 240° C. The temperature employed can be varied, of course, depending upon the polymerization time desired, the degree of vacuum employed, the melting point of the reactants and products and similar variable factors. The temperature employed should be at least as high as the boiling point of the glycol liberated at the pressure employed and can therefore be at or about the boiling temperature of the glycol if atmospheric pressure is employed or if a lower pressure is employed during the polymerization stage. The polymerization stage is desirably carried out at pressures below about 1 mm. Hg for optimum results with pressures of 0.1–0.5 mm. or lower being particularly suitable. The polymerization stage is continued until the polymer obtained is capable of forming fibers and films (including sheets) which can be oriented to give the highly flexible and strong shaped articles for which these polymers are particularly adapted.

Although the invention has been described in detail with particular reference to certain preferred embodiments thereof, it will be understood that variations and modifications can be effected within the spirit and scope of the invention as described hereinabove and as defined in the appended claims.

We claim:

1. A highly polymeric copolyester having a melting point of at least 200° C., an inherent viscosity of at least 0.8 and being obtained by heating at a temperature of 100–300° C. a mixture of bifunctional reactants consisting functionally of alkylene glycol, N,N'-bis(p-carboxybenzoyl)alkylene diamine, and isophthalic acid, each of said alkylene groups containing 2–10 carbon atoms, said copolyester resulting solely from the condensation polymerization of the glycol diesters of the formulas

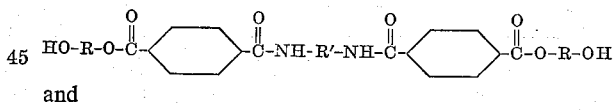

and

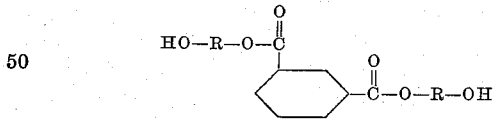

with the liberation of glycol of the formula

HO—R—OH wherein R and R' are alkylene groups of 2–10 carbon atoms said alkylene glycol amounting to at least two molar proportions for each molar proportion of the combined amount of said diamine and said isophthalic acid, said isophthalic acid amounting to 5–60% of the combined amount of said diamine and said isophthalic acid.

2. A highly polymeric copolyester having a melting point of at least 200° C., an inherent viscosity of at least 0.8 and resulting from the heating at 100–300° C. of a mixture; of dihydroxylic material consisting of at least two molar proportions of at least one polymethylene glycol containing 2–10 carbon atoms, and one molar proportion of dicarboxylic material consisting of 10–95 mole percent of an ester of N,N'-bis(p-carboxybenzoyl)polymethylene diamine wherein the polymethylene group contains 2–10 carbon atoms and 90–5 mole percent of an ester of isophthalic acid based on the total weight of said dicarboxylic material wherein each ester group is an alkyl group of 1–6 carbon atoms, said copolyester resulting solely from the condensation polymerization of the glycol diesters of the formulas

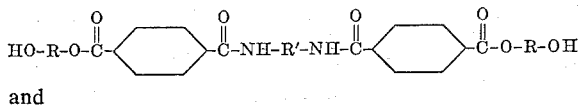

and

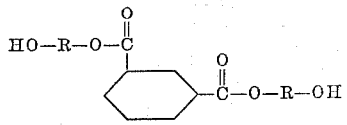

with the liberation of glycol of the formula

HO—R—OH wherein R and R' are alkylene groups of 2–10 carbon atoms.

3. A highly polymeric copolyester having a melting point of at least 200° C., an inherent viscosity of at least 0.8 and being obtained by heating at 100–300° C. a mixture of at least two molar proportions of a polymethylene glycol containing 2–10 carbon atoms, one molar proportion of a mixture of 90–40 mole percent of a lower alkyl diester of N,N'-bis(p-carboxybenzoyl)polymethylene diamine wherein the polymethylene group contains 2–10 carbon atoms, and a lower alkyl diester of isophthalic acid, each said lower alkyl group containing 1–6 carbon atoms, said diester of isophthalic acid amounting to 10–60 mole percent of the combined weight of said diesters, said copolyester resulting solely from the condensation polymerization of the glycol diesters of the formulas

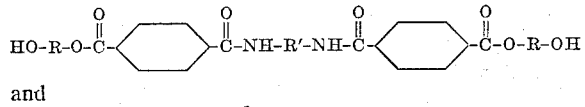

and

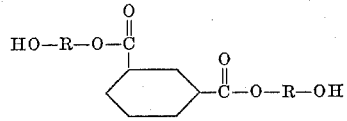

with the liberation of glycol of the formula

HO—R—OH wherein R and R' are alkylene groups of 2–10 carbon atoms.

4. A highly polymeric copolyester, in fiber form, having an inherent viscosity of at least 0.8 and obtained by heating at 200–300° C. a mixture; of bifunctional reactants consisting functionally of at least two molar proportions alkylene glycol, and one molar proportion of a mixture of 60–80 mole percent of; N,N'-bis(p-carboxybenzoyl)alkylene diamine, and 40–20 mol percent of isophthalic acid, each of said alkylene groups containing 2–10 carbon atoms, said copolyester having a melting point of at least 200° C. and resulting from the condensation polymerization of glycol diesters of the formulas

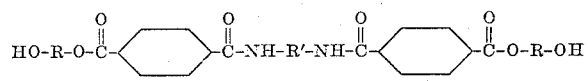

and

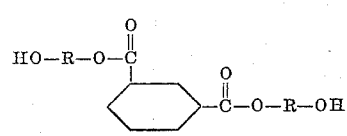

with the liberation of glycol of the formula

HO—R—OH wherein R and R' are alkylene groups of 2–10 carbon atoms.

5. A highly polymeric copolyester, in sheet form, having an inherent viscosity of at least 0.8 and obtained by heating at 200–300° C. a mixture; of bifunctional reactants consisting functionally of at least two molar proportions alkylene glycol, and one molar proportion of a mixture of 60–80 mole percent of; N,N'-bis(p-carboxybenzoyl)alkylene diamine, and 40–20 mol percent of isophthalic acid, each of said alkylene groups containing 2–10 carbon atoms, said copolyester having a melting point of at least 200° C. and resulting from the condensation polymerization of glycol diesters of the formulas and with the liberation of glycol of the formula

HO—R—OH wherein R and R' are alkylene groups of 2–10 carbon atoms.

6. A highly polymeric copolyester having an inherent viscosity of at least 0.8 and resulting by heating at 200–300° C. a mixture of at least two molar proportions; of hexane-1,6-diol with one molar proportion of a mixture of a lower alkyl diester of N,N'-bis(p-carboxybenzoyl)hexamethylene diamine and a lower alkyl diester of isophthalic acid, said diester of isophthalic acid amounting to 20–40 mole percent of the combined weight of said diesters, each said lower alkyl group containing 1–6 carbon atoms, said copolyester having a melting point above 200° C. and consisting solely of recurring units of the formulas and 7. A highly polymeric copolyester having an inherent viscosity of at least 0.8 and resulting by heating at 200–300° C. a mixture of at least two molar proportions; of hexane-1,6-diol, with one molar proportion of a mixture of a lower alkyl diester of N,N'-bis(p-carboxybenzoyl)tetramethylene diamine, and a lower alkyl diester of isophthalic acid, said diester of isophthalic acid amounting to 10–60 mole percent of the combined weight of said diesters, each said lower alkyl group containing 1–6 carbon atoms, said copolyester having a melting point above 200° C. and consisting solely of recurring units of the formulas and 8. A highly polymeric copolyester having an inherent viscosity of at least 0.8 and resulting by heating at 200–300° C. a mixture of at least two molar proportions of hexane-1,6-diol, with one molar proportion of a mixture of a lower alkyl diester of N,N'-bis(p-carboxybenzoyl)ethylene diamine, and a lower alkyl diester of isophthalic acid, said diester of isophthalic acid amounting to 10–60 mole percent of the combined weight of said diesters, each said lower alkyl group containing 1–6 carbon atoms, said copolyester having a melting point above 200° C. and consisting solely of recurring units of the formulas

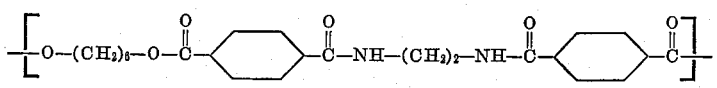

and

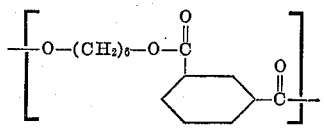

9. The method which comprises heating, at a temperature above 200° C. and in the presence of an ester-interchange catalyst, a mixture of at least two molar proportions of a polymethylene glycol containing 2–10 carbon atoms, and one molar proportion of esters consisting of 10–95 mole percent of a $C_1$–$C_6$ alkyl diester of an N,N' - bis(p - carboxybenzoyl)polymethylene diamine wherein the polymethylene group contains 2–10 carbon atoms, and 90–5 mol percent of an alkyl ester of isophthalic acid wherein each alkyl group contains 1–6 carbon atoms, said heating being continued until a copolyester of fiber-forming viscosity of at least 0.8 is obtained.

10. The method which comprises heating, at a temperature above 200° C. and in the presence of an ester-interchange catalyst, a mixture of at least two molar proportions of hexane-1,6-diol, and one molar proportion of dicarboxylic material consisting of 80–60 mole percent of a lower alkyl diester of N,N'-bis(p-carboxybenzoyl)hexamethylene diamine and 20–40 mole percent of a lower alkyl diester of isophthalic acid, each said lower alkyl group containing 1–6 carbon atoms removing monohydric alcohol liberated thereby, and heating the resulting reaction mixture at a temperature above 200° C. and reduced pressure effective to distill hexane-1,6-diol until a copolyester of fiber-forming viscosity of at least 0.8 is obtained.

11. The method which comprises heating, at a temperature above 200° C. and in the presence of an ester-interchange catalyst, a mixture of at least two molar proportions of hexane-1,6-diol, and one molar proportion of dicarboxylic material consisting of 40–90 mole percent of a lower alkyl diester of N,N'-bis(p-carboxybenzoyl)tetramethylene diamine and 60–10 mole percent of a lower alkyl diester of isophthalic acid, each said lower alkyl group containing 1–6 carbon atoms removing monohydric alcohol liberated thereby, and heating the resulting reaction mixture at a temperature above 200° C. and reduced pressure effective to distill hexane-1,6-diol until a copolyester of fiber-forming viscosity of at least 0.8 is obtained.

12. The method which comprises heating, at a temperature above 200° C. and in the presence of an ester-interchange catalyst, a mixture of at least two molar proportions of hexane-1,6-diol, and one molar proportion of dicarboxylic material consisting of 60–90 mole percent of a lower alkyl diester of N,N'-bis(p-carboxybenzoyl)ethylene diamine and 40–10 mole percent of a lower alkyl diester of isophthalic acid, each said lower alkyl group containing 1–6 carbon atoms removing monohydric alcohol liberated thereby, and heating the resulting reaction mixture at a temperature above 200° C. and reduced pressure effective to distill hexane-1,6-diol until a copolyester of fiber-forming viscosity of at least 0.8 is obtained.

13. The method which comprises coreacting bifunctional reactants consisting functionally of alkylene glycol, N,N'-bis(p-carboxybenzoyl)alkylene diamine, and isophthalic acid under conditions causing formation of a copolyester of fiber-forming viscosity, said coreacting being effected according to the process of claim 9 extruding the resulting copolyester, and drawing the resulting extruded article to effect orientation of said copolyester.

14. The method which comprises coreacting at a temperature above 200° C. a mixture of at least two molar proportions of hexane-1,6-diol, and one molar proportion of dicarboxylic material consisting of 60–80 mole percent of a lower alkyl diester of N,N'-bis(p-carboxybenzoyl)-hexamethylene diamine and 40–20 mole percent of a lower alkyl diester of isophthalic acid wherein each said lower alkyl group contains 1–6 carbon atoms, to form a fiber-forming copolyester having an inherent viscosity of at least 0.8, melt extruding said copolyester, and orienting said copolyester in the resulting extruded article by drawing said article at least 200%.

References Cited in the file of this patent

FOREIGN PATENTS

| | | |
|---|---|---|
| 2,071,250 | Carothers | Feb. 16, 1937 |
| 2,692,253 | Holmen | Oct. 19, 1954 |